(12) United States Patent
Hur et al.

(10) Patent No.: US 11,260,488 B2
(45) Date of Patent: Mar. 1, 2022

(54) METHOD OF MANUFACTURING DIAMOND KNIFE FOR ULTRA-MICROTOME FOR CONTINUOUS CUTTING

(71) Applicant: KOREA BASIC SCIENCE INSTITUTE, Daejeon (KR)

(72) Inventors: Hwan Hur, Daejeon (KR); Geon-Hee Kim, Sejong-si (KR); Ji Yong Bae, Sejong-si (KR); Hee-Seok Kweon, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 818 days.

(21) Appl. No.: 15/995,018

(22) Filed: May 31, 2018

(65) Prior Publication Data

US 2018/0345437 A1     Dec. 6, 2018

(30) Foreign Application Priority Data

May 31, 2017     (KR) .................. 10-2017-0067789

(51) Int. Cl.
*B24B 3/36*     (2006.01)
*G01N 1/06*     (2006.01)
*B23K 26/364*     (2014.01)

(52) U.S. Cl.
CPC ............. *B24B 3/36* (2013.01); *B23K 26/364* (2015.10); *G01N 1/06* (2013.01); *G01N 2001/061* (2013.01)

(58) Field of Classification Search
CPC .......... B24B 3/36; B23K 26/364; G01N 1/06; G01N 2001/061
See application file for complete search history.

(56) References Cited

U.S. PATENT DOCUMENTS

| 4,485,706 A | * | 12/1984 | Disharoon | B23P 15/40 |
| | | | | 30/350 |
| 2002/0014013 A1 | * | 2/2002 | Graupner | G01N 1/06 |
| | | | | 30/350 |
| 2005/0266680 A1 | * | 12/2005 | Daskal | A61B 17/3211 |
| | | | | 438/637 |
| 2013/0138103 A1 | * | 5/2013 | Cheng | B23K 26/355 |
| | | | | 606/45 |

FOREIGN PATENT DOCUMENTS

JP     2008-101964 A     5/2008

OTHER PUBLICATIONS

Osman et al. "A parametric study of the hydrophobicity of rough surfaces based on finite element computations." Nov. 2014. <https://www.researchgate.net/publication/264828088_A_parametric_study_of_the_hydrophobicity_of_rough_surfaces_based_on_finite_element_computations>. (Year: 2014).*

* cited by examiner

*Primary Examiner* — Joel D Crandall
(74) *Attorney, Agent, or Firm* — Knobbe Martens Olson & Bear LLP (57) ABSTRACT

Provided is a method of manufacturing a diamond knife for an ultra-microtome, including determining a shape and size of a knife, performing a multiphase flow analysis on movement of a droplet at a fore-end of the knife with the determined shape and size, processing a fine pattern to ensure hydrophobic property according to a result of the flow analysis, and grinding a blade of the knife after the processing of the fine pattern to minimize an interval between the pattern and the blade and, thus, a knife blade is always maintained in a wet state due to a droplet movement between a hydrophobic fine pattern and a hydrophilic surface to continuously generate ultrathin slices.

10 Claims, 10 Drawing Sheets

METHOD OF MANUFACTURING DIAMOND KNIFE FOR ULTRA-MICROTOME FOR CONTINUOUS CUTTING

CROSS-REFERENCE TO RELATED APPLICATIONS

This application claims priority under 35 U.S.C. § 119 to Korean Patent Application No. 10-2017-0067789, filed on May 31, 2017, in the Korean Intellectual Property Office, the disclosure of which is incorporated herein by reference in its entirety.

TECHNICAL FIELD

The following disclosure relates to a method of manufacturing a diamond knife for an ultra-microtome for continuous cutting, and in particular, to a diamond knife installed in a microtome for cutting a test piece to form an ultrathin slice and a method of manufacturing the same.

BACKGROUND

A microtome refers to a machine for thinly cutting a biological tissue, etc., to a thickness to enable microscope observation. A slice formed as such may have a cutting thickness that is varied depending on whether the slice is used for an optical microscope or an electron microscope and, an observation sample for an electron microscope is generally prepared as an ultrathin slice with a thickness equal to 0.1 µm or less.

The aforementioned microtome may be classified into a microtome of fixing a cutting blade and moving a sample and a microtome of fixing a sample and moving a cutting blade.

Japanese Patent Laid-Open Publication No. 2008-101964 ("Ultra-Microtome") discloses a device of continuously generating an ultrathin slice.

The disclosure of this section is to provide background of the invention. Applicant notes that this section may contain information available before this application. However, by providing this section, Applicant does not admit that any information contained in this section constitutes prior art.

SUMMARY

An embodiment of the present invention is directed to providing a method of manufacturing a diamond knife for an ultra-microtome, for performing multiphase flow analysis on a droplet movement at a fore-end of a knife through two-dimensional (2D) finite-element analysis and, thus, manufacturing the knife to always maintain a blade of the fore-end in a wet state.

In one general aspect, a method of manufacturing a diamond knife for an ultra-microtome includes determining a shape and size of a knife, performing a multiphase flow analysis on movement of a droplet at a fore-end of the knife with the determined shape and size, processing a fine pattern to ensure hydrophobic property according to a result of the flow analysis, and grinding a blade of the knife after the processing of the pattern to minimize an interval between the pattern and the blade.

The multiphase flow analysis may include two-dimensional (2D) finite-element analysis on a droplet movement.

The 2D finite-element analysis on the droplet movement may use a region ratio between a pattern-processed hydrophobic surface and a hydrophilic surface as an objective function.

The processing of the fine pattern may use a mechanical processing method.

The mechanical processing method may be laser processing.

The laser processing may use a laser with a wavelength of 150 nm to 250 nm.

The method may further include forming an inclined diagonal groove in a surface of the knife during the laser processing, and a diamond knife manufactured using the method may have an inclined diagonal groove formed in a surface of the knife.

The method may further include forming a lattice groove in a surface of the knife during the laser processing, and a diamond knife manufactured using the method may have a lattice groove in a surface of the knife.

In the diamond knife according to embodiments of the present invention, a pattern with ensured hydrophobic property may be formed on a surface of the knife.

DETAILED DESCRIPTION OF EMBODIMENTS

Hereinafter, a method of manufacturing a diamond knife for an ultra-microtome according to embodiments will be described in detail with reference to the accompanying drawings. The following drawings are introduced to provide complete understanding of the scope and spirit of the present invention. Accordingly, the present invention may be carried out in other ways than the following drawings. Throughout this specification, the same reference numerals in the drawings denote the same element.

All the terms used herein, which include technical or scientific terms, may have the same meaning that is generally understood by a person skilled in the art. In the description according to embodiments of the present invention and the accompanying drawings, certain detailed explanations of well-known functions and configurations are omitted when they are deemed that they may unnecessarily obscure the essence of the invention.

Typically, an ultra-microtome for preparing as thin sample as possible uses a knife with a cutting blade formed of diamond or glass. Here, a thin slice is prepared via continuous cutting by the knife and, thus, a cutting edge surface of the knife becomes dry which causes a curling phenomenon. Accordingly, an operator needs to additionally perform an operation for re-spreading ultrathin slices that are continuously prepared, and thus, which leads lower working speed. In addition, in the case of a wet cutting method that is performed while a fluid is filled in a knife boat, it is frequently difficult to continuously perform an operation due to water leak.

Figure 1:
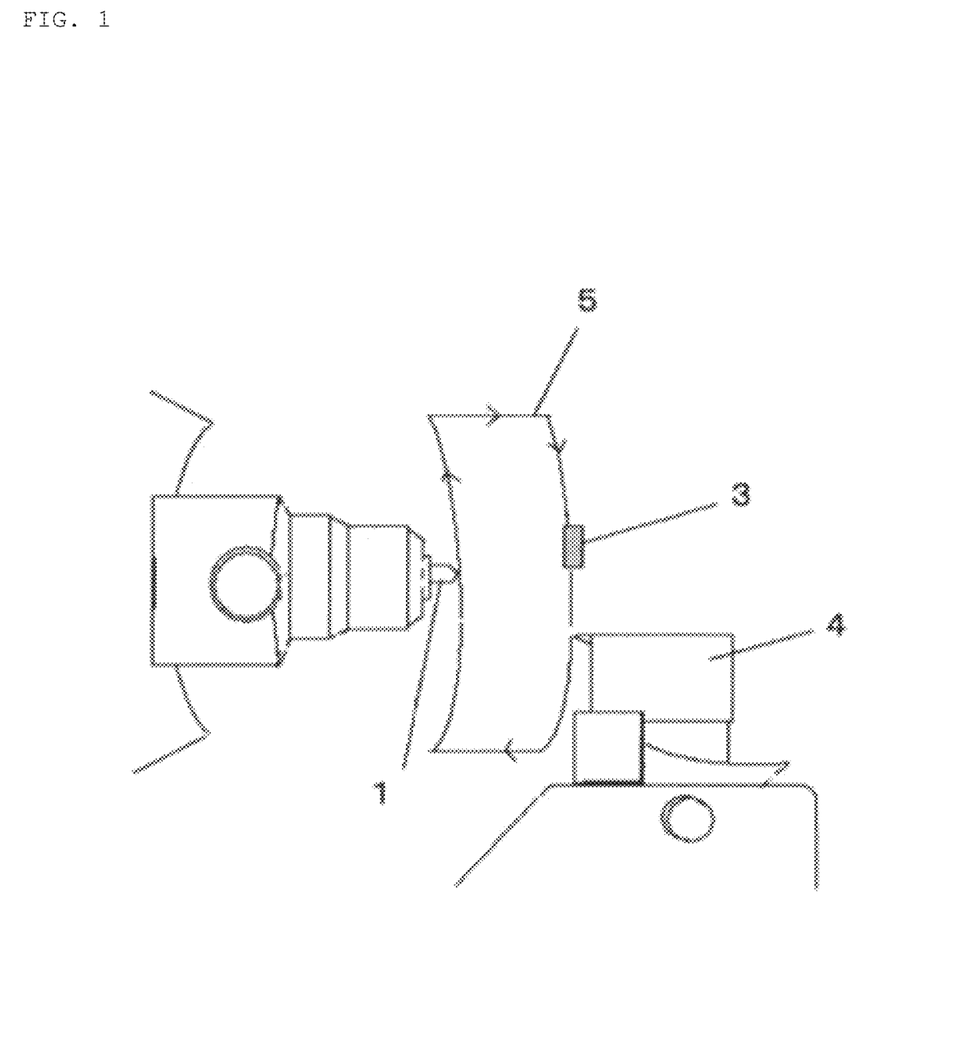
FIG. 1 is a diagram showing a configuration of an ultra-microtome.

FIG. 1 shows a typical device of continuously generating an ultrathin slice without arm movement stop. With regard to the device, as shown in FIG. 1, to remove water from a sample block 1, the sample block 1 has a path 5 that crosses a diamond knife 4 and a water remover 3.

When the above method is used, moisture accumulating on a sample block is advantageously removed but, when a water remover and a cutting surface of the sample block continuously contact each other during continuous cutting and scanning of ultrathin slices, the water remover and the cutting surface are inevitably damaged. Such a friction method has a limit in that it is difficult to recognize a three-dimensional (3D) nano-structure such as a biological sample prepared based on each ultrathin slice.

Figure 2:
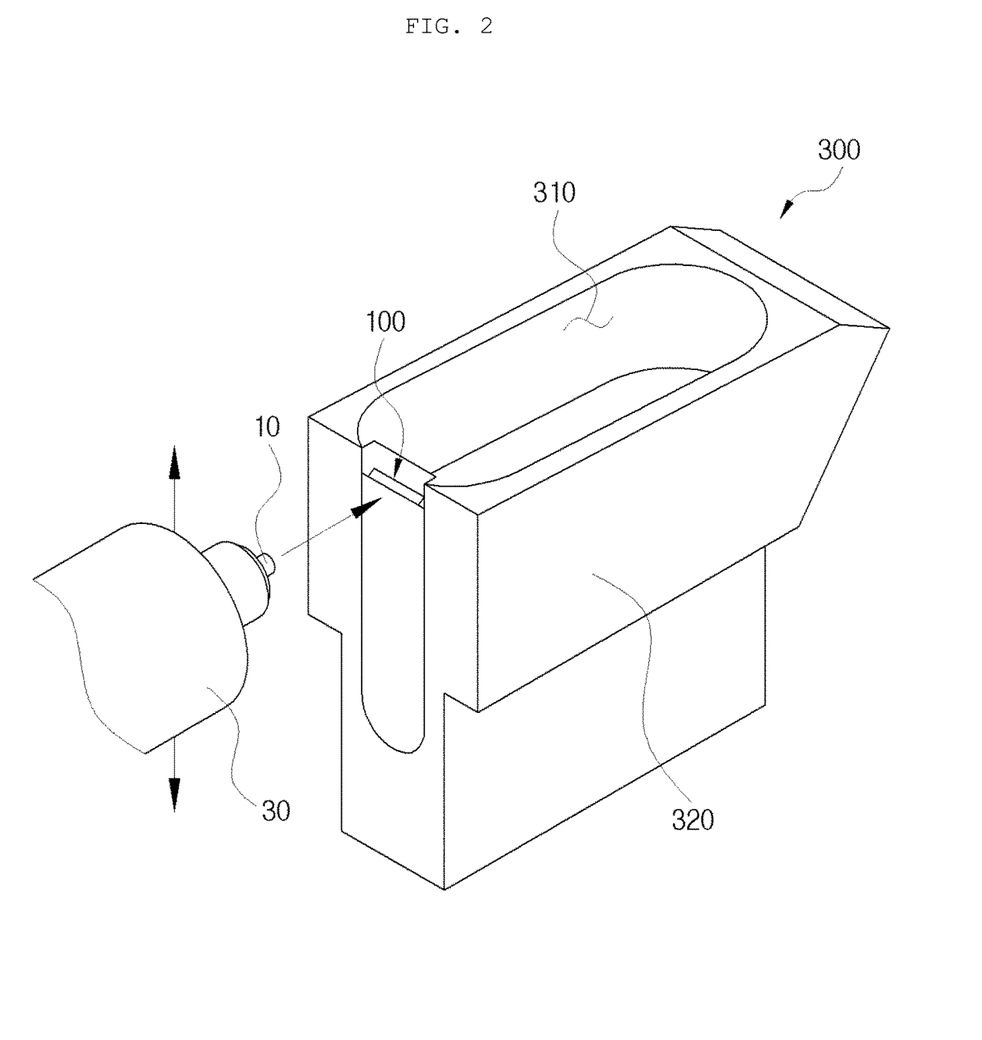
FIG. 2 is a perspective view of a knife boat according to an embodiment of the present invention.
Figure 3:
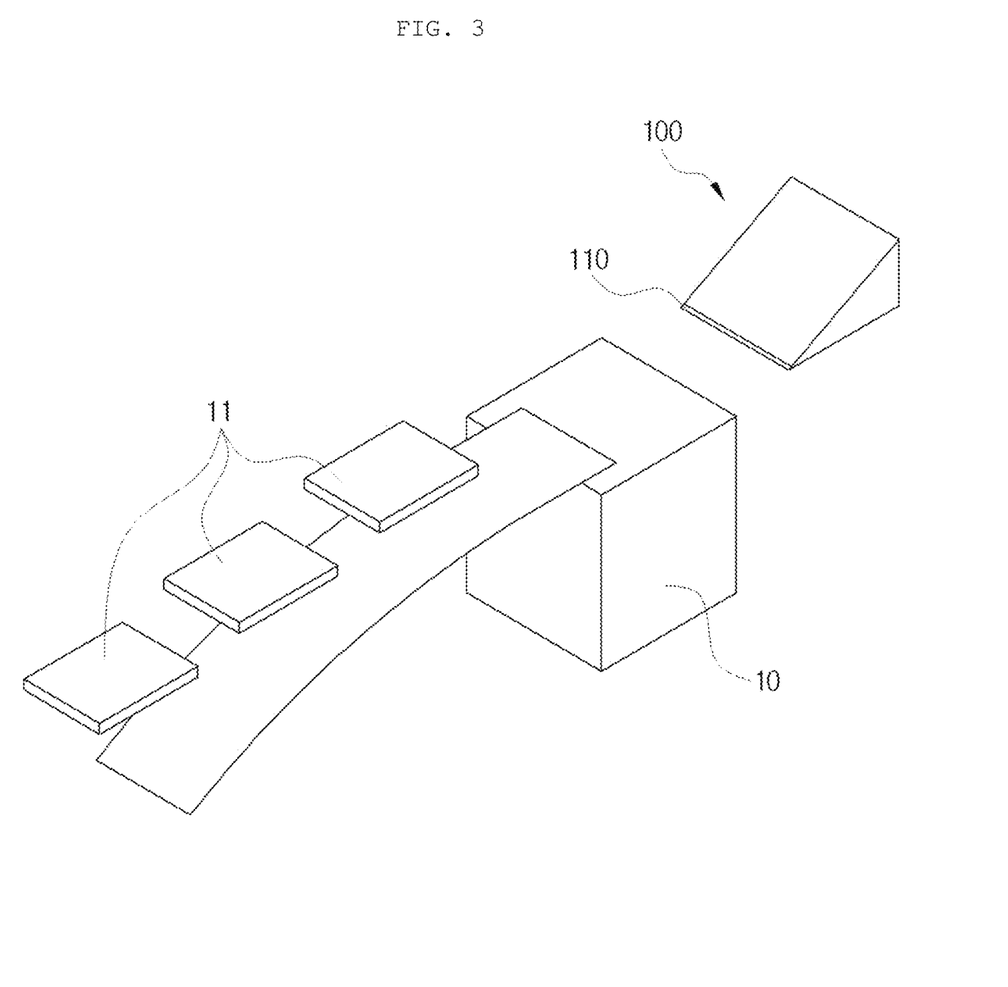
FIG. 3 is a schematic diagram showing a method of generating a slice according to an embodiment of the present invention.

FIGS. 2 and 3 are diagrams showing a diamond knife for an ultra-microtome according to an embodiment of the present invention and, in this regard, FIG. 2 is a perspective view of a knife boat and FIG. 3 is a schematic diagram showing a procedure of generating a slice. Referring to FIG. 2, a knife 100 according to embodiments of the present invention may be used with a knife boat 300. A sample 10 for generating an ultrathin slice may be installed on a sample chuck 30, the knife 100 according to embodiments of the present invention may be attached to the knife boat 300 and, in this case, a blade of the knife 100 may protrude to face the sample 10. As such, when the knife boat 300 is used therewith, an internal space 310 may be formed in the knife boat 300 and filled with a fluid such as water, and the fluid may be provided to maintain a state in which a fore-end blade of the knife 100 attached to a main body 320 of the knife boat 300 is always wet. The sample chuck 30 may be used with a chuck holder or a driving arm and may perform repetitive motion to continuously generate ultrathin slices. Here, the knife 100 according to embodiments of the present invention is not limited only to equipment with such a shape and may also be used in a device that is repeatedly moved while being connected to an arm and to which the sample chuck 30 is fixed.

Referring to FIG. 3, according to embodiments of the present invention, an ultrathin slice 11 may be generated using the following method. Any one of the sample 10 or the knife 100 may be repeatedly moved while being connected to a driving arm and a blade of the knife 100 may gradually cut a surface of the sample to generate the ultrathin slice 11. The generated ultrathin slices 11 may be collected and observed by an electron microscope, etc., and scanned and used to establish a three-dimensional (3D) model.

Figure 4:
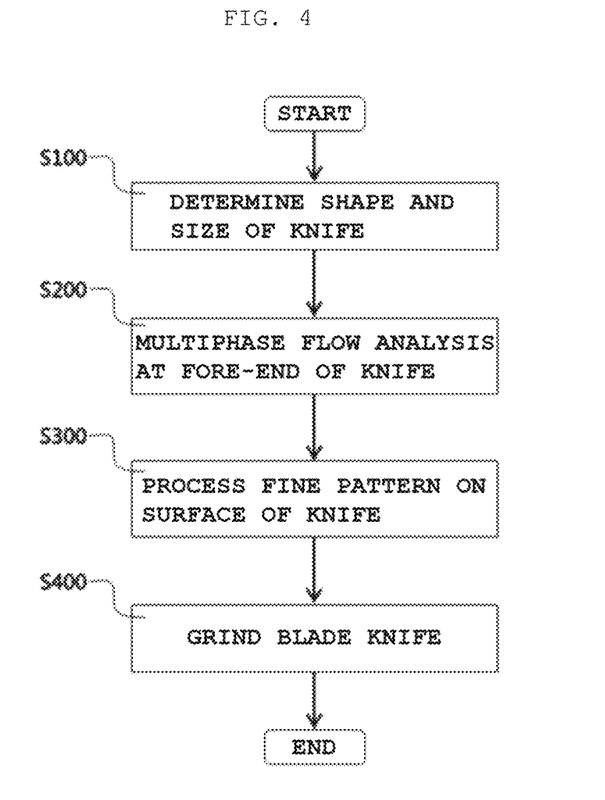
FIG. 4 is a flowchart of a method of manufacturing a diamond knife for an ultra-microtome according to embodiments of the present invention.

FIGS. 4 and 5 are diagrams showing a method of manufacturing a diamond knife for an ultra-microtome according to an embodiment of the present invention. FIG. 4 is a flowchart of the method and FIG. 5 is a schematic diagram of the method. Referring to FIG. 4, the manufacturing method according to embodiments of the present invention may include determining a shape and size of a knife (S100), performing a multiphase flow analysis on movement of a droplet at a fore-end of the knife with the determined shape and size (S200), processing a fine pattern to ensure hydrophobic property according to the flow analysis result (S300), and grinding a blade of the knife after the processing of the pattern to minimize an interval between the pattern and the blade (S400), which will be described in detail with reference to FIG. 5.

As shown in FIG. 5, in the determining the shape and the size of the knife (S100), an operator may determine a size, an angle, or the like of the knife depending on the use and installation size of the knife 100. As shown in FIG. 5A, the knife 100 may be formed with a sharp end portion and may gradually expand at a predetermined angle based on the end portion. In this case, the angle may be set by a user. The knife 100 may have a knife surface 120 formed of a hydrophilic material.

Figure 5A:
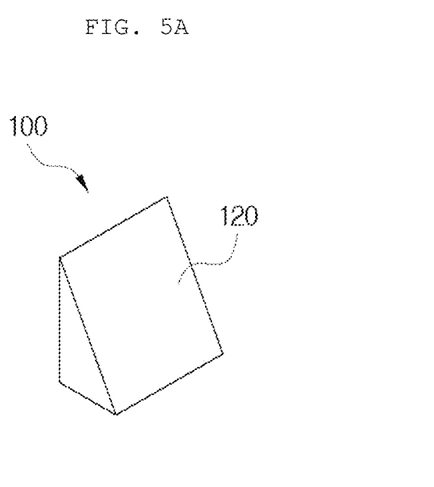
FIGS. 5A to 5D are schematic diagrams of a method of manufacturing a diamond knife for an ultra-microtome according to embodiments of the present invention.
Figure 5B:
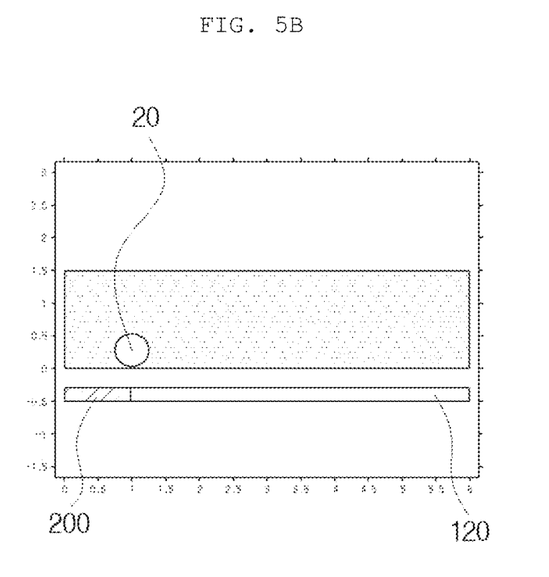

Although described below with reference to FIGS. 6 and 7 in more detail, the performing of the multiphase flow analysis (S200) is now schematically described with reference to FIG. 5B. The knife 100 may process a fine pattern 200 for ensuring the hydrophobic property on a surface of the knife 100 and multiphase flow analysis when a droplet 20 drips between the hydrophobic fine pattern 200 and the hydrophilic knife surface 120 may be determined. In this case, the multiphase flow analysis may be 2D finite-element analysis of a droplet movement and the 2D finite-element analysis may deduce a result using a region ratio between the hydrophobic fine pattern 200 and the hydrophilic knife surface 120 as an objective function.

Figure 5C:
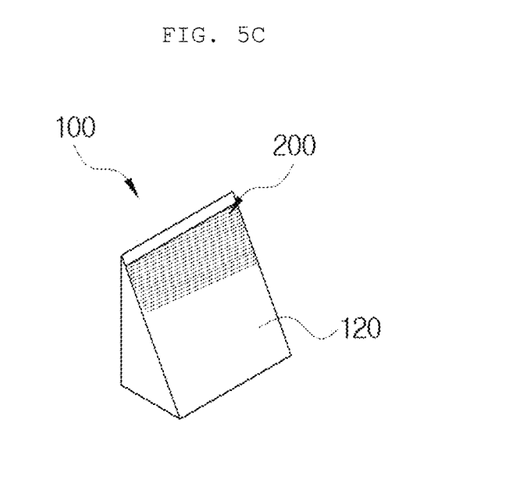

In the processing of the fine pattern (S300), the fine pattern 200 may be processed on the knife surface 120 that is adjacent to a fore-end of the knife 100 according to the result of flow analysis, as shown in FIG. 5C. In this case, the fine pattern 200 may be processed at a point of the knife 100, for optimizing a droplet effect on a surface and a position of the point may be determined according to the result of the flow analysis. In this case, the fine pattern 200 may be formed using a mechanical processing method and the most optimizing method may be a processing process using a laser with a wavelength of 150 nm to 250 nm. As such, the fine pattern 200 that is semi-permanent may be processed on a surface of a diamond knife. The fine pattern 200 may be formed with an inclined diagonal groove or lattice grooved via the laser processing. Through the inclined diagonal groove, the knife 100 according to embodiments of the present invention may be configured to obtain a droplet effect.

Figure 5D:
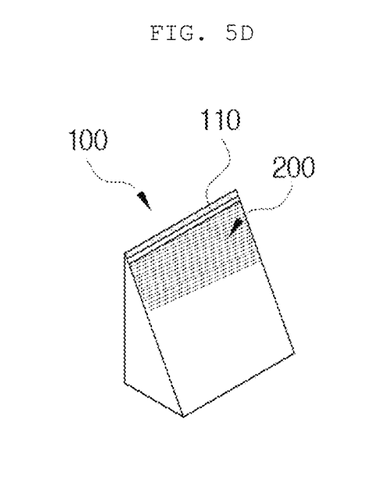

In the grinding of the blade of the knife (S400), a knife blade 110 at a fore-end of the knife 100 may be ground as shown in FIG. 5D. In this case, the knife blade 110 may be ground adjacent to the fine pattern 200 and configured to always maintain a wet state through the droplet effect.

Figure 6:
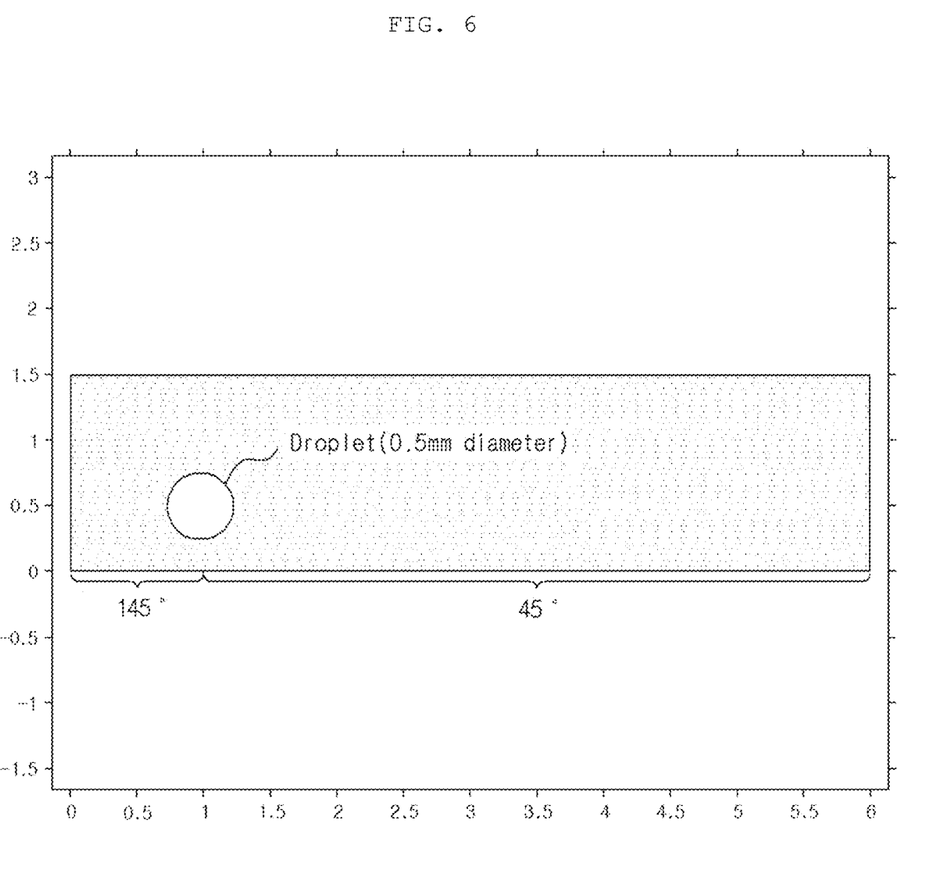
FIG. 6 is a diagram showing a two-dimensional (2D) finite-element model of a method of manufacturing a diamond knife for an ultra-microtome according to embodiments of the present invention.
Figure 7:
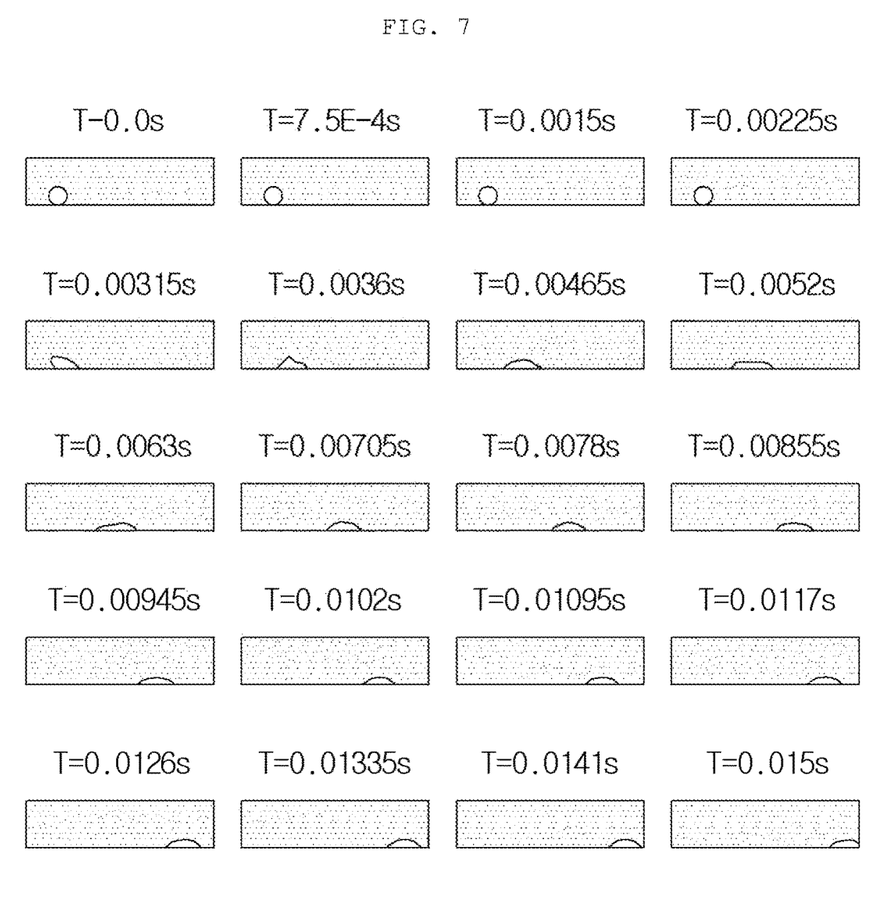
FIG. 7 is a diagram showing a droplet movement over time of a method of manufacturing a diamond knife for an ultra-microtome according to embodiments of the present invention.

FIGS. 6 and 7 are diagrams showing a method of manufacturing a diamond knife for an ultra-microtome according to an embodiment of the present invention and show a 2D finite-element model. Referring to FIG. 6, the 2D finite-element model may be analyzed by dripping a droplet on a flat bottom. In this case, a description of FIG. 6 is given in more detail while an x axis and a y axis are arbitrarily set as a horizontal direction and a vertical direction, respectively.

An analysis target in FIG. 6 is a DI-Water droplet with a diameter of 0.5 mm and is assumed to be dropped from a height of 0.05 mm. A region with x less than 1 mm is a hydrophobic surface on which a fine pattern with a contact angle of 145 degrees is processed and a region with x greater than 1 mm is a hydrophilic surface with a contact angle of 45 degrees. The 2D finite-element model may be configured with an element on three surfaces with 4 panel points and modeled using a total of sixty thousand elements for highly accurate analysis. In this case, an applied fluid has the following material property values.

| Material properties | Water | Air |
|---|---|---|
| Dynamic viscosity (Pa · s) | $100.2 \times 10^5$ | $1.822 \times 10^5$ |
| Density (kg/m$^3$) | 1,000 | 1.2041 |

In this case, embodiments of the present invention use general-purpose multi-physics finite-element analysis software (COMSOL multi-physics) for understanding of a basic mechanism of movement caused by wall adhesive force of a droplet put on the hydrophilic/hydrophobic surface and, therethrough, multiphase flow analysis may be performed.

The finite-element analysis according to embodiments of the present invention may employ a level set method as a method of tracking a phase interface to perform numerical analysis and such a method may accurately calculate a curvature of the phase interface through a continuous function.

Assuming that two fluids are incompressible flows that are not mixed with each other, flow analysis is performed using Navier-stokes equations. In addition, a bottom that a drop contacts is set to a wetted wall condition and the remaining interface is set to a pressure condition.

A background fluid is assumed to be air as shown in the above table, a surface tension coefficient between air and a droplet is 0.07 N/m, a time step $\Delta t$ is set to $1.5e^{-4}$ s and calculated to 0.015 s. A numerical analysis result therefrom is shown in FIG. 7.

FIG. 7 shows a result of the above set finite-element analysis according to a time step. As seen from FIG. 7, initially, a droplet is spread on a hydrophilic surface with high adhesive force and contracts on a hydrophobic fine pattern surface with high cohesiveness because of wall adhesive forces of surfaces with opposite properties. Then, it is seen that the droplet is moved to the hydrophilic surface while being modified in various forms.

Figure 8A:
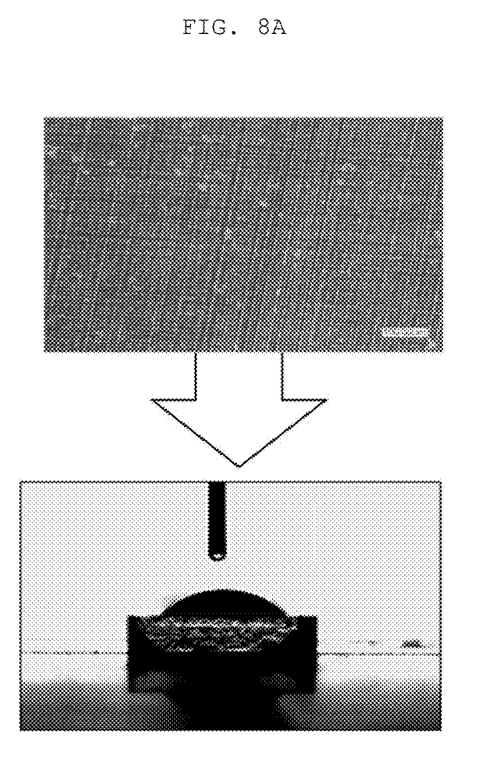
FIGS. 8A and 8B are diagrams showing a droplet that drips on a hydrophilic surface and a hydrophobic surface with a fine pattern.
Figure 8B:
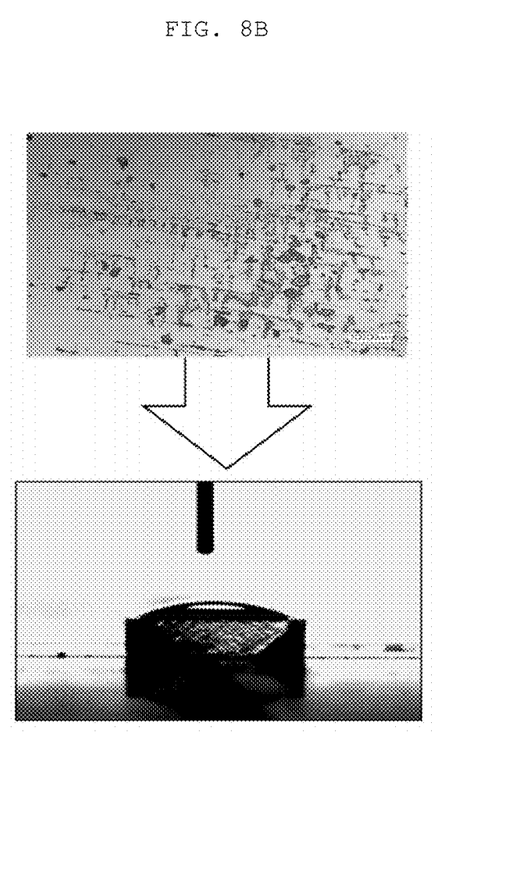

Accordingly, the knife according to embodiments of the present invention may be configured in such a way that a fore-end portion with a knife blade formed thereon is hydrophilic and a fine pattern is processed at a point adjacent to the fore-end portion to ensure hydrophobic property, thereby guiding a droplet to be moved to the fore-end portion of the knife blade. As such, there are various methods of ensuring hydrophobic property and, even if a surface is not divided into hydrophobic and hydrophilic surfaces like in a point with x of 1, contact angles are different and, thus, a droplet movement may be caused. As seen from FIG. 8, even if surfaces are formed of the same material, a fine pattern is processed and, thus, hydrophobic property is ensured.

FIG. 8A shows a diamond on which a fine pattern is processed and FIG. 8B shows a diamond on which a fine pattern is not processed. It may be seen that the diamonds have different roughness degrees and, the diamond on which the fine pattern is processed has a higher contact angle than that of the diamond on which a fine pattern is not processed and, thus, has relatively hydrophobic property. In addition, according to embodiments of the present invention, the features may be applied to a diamond knife to achieve a droplet effect.

According to the aforementioned method of manufacturing a diamond knife for an ultra-microtome according to embodiments of the present invention, a knife may be manufactured via multiphase flow analysis and an inclined diagonal groove or lattice groove is formed on a surface of the knife and, thus, a fore-end of the knife may be always maintained in a wet state, thereby preventing an ultrathin slice from being curled. Accordingly, an operator does not necessarily spread the curled ultrathin slice and, thus, ultrathin slices may be continuously generated to reduce working time. In addition, the generated ultrathin slice according to embodiments of the present invention has excellent quality compared with the prior art and, thus, it is easy to reestablish a 2D microscope image to a 3D image, thereby advantageously enhancing the reliability of the established 3D image.

Embodiments of the present invention may provide a technology for preventing semi-permanent curling by forming a groove in a surface of a diamond knife via mechanical processing using a laser. Embodiments of the present invention is advantageous in that, during production of the diamond knife, a fine pattern is preferentially processed and a blade of a cutting edge surface as a fore-end of a knife is easily ground and processed.

It will be obvious to those skilled in the art to which the present invention pertains that the present invention described above is not limited to the above-mentioned embodiments and the accompanying drawings, but may be variously substituted, modified, and altered without departing from the scope and spirit of the present invention.

Accordingly, the present invention is not limited to the abovementioned embodiments, and may be variously applied, and may be variously modified without departing from the gist of the present invention claimed in the claims.

What is claimed is:

1. A method of manufacturing a diamond knife for an ultra-microtome with a hydrophobic surface, the method comprising:
    determining a shape and size of a knife with a hydrophilic surface;
    performing a multiphase flow analysis on a movement of a droplet to determine a ratio between the hydrophilic surface of the knife and a hydrophobic surface to be provided on the knife that would cause a given droplet on the knife to be guided to be moved to a fore-end portion of a knife blade of the knife;
    processing, according to a result of the multiphase flow analysis, a fine pattern on the knife to provide the hydrophobic surface on the knife; and
    subsequent to the processing of the fine pattern, grinding the knife blade such that the fore-end portion of the knife blade is hydrophilic and a portion of the knife that is adjacent to the fore-end portion is hydrophobic, thereby guiding the given droplet to be moved to the fore-end portion of the knife blade.

2. The method of claim 1, wherein the multiphase flow analysis comprises a two-dimensional (2D) finite-element analysis on a droplet movement.

3. The method of claim 1, wherein the processing of the fine pattern uses a mechanical processing method.

4. The method of claim 3, wherein the mechanical processing method is laser processing.

5. The method of claim 4, wherein the laser processing uses a laser with a wavelength of 150 nm to 250 nm.

6. The method of claim 4, further comprising forming an inclined diagonal groove on a surface of the knife during the laser processing.

7. The method of claim 4, further comprising forming a lattice groove on a surface of the knife during the laser processing.

8. A diamond knife manufactured using the method of claim 6, wherein the inclined diagonal groove is formed on the surface of the knife.

9. A diamond knife manufactured using the method of claim 7, wherein the lattice groove is formed on the surface of the knife.

10. A diamond knife manufactured using the method of claim 1, wherein the fine pattern is formed on a surface of the knife.

\* \* \* \* \*